United States Patent [19]

Lee

[11] 4,410,664

[45] Oct. 18, 1983

[54] POLYIMIDE-EPOXY THERMOSET RESINS

[75] Inventor: Chung J. Lee, Sheboygan, Wis.

[73] Assignee: Plastics Engineering Company, Sheboygan, Wis.

[21] Appl. No.: 420,565

[22] Filed: Sep. 20, 1982

[51] Int. Cl.³ ..................... C08G 59/40; C08G 73/10
[52] U.S. Cl. ................................. 525/180; 525/423; 525/504; 528/93; 528/113; 528/114; 528/322; 528/350
[58] Field of Search ................ 525/180, 423, 504; 528/93, 113, 114, 322, 350

[56] References Cited

U.S. PATENT DOCUMENTS

| | | | |
|---|---|---|---|
| 3,663,651 | 5/1972 | Traut | 525/423 X |
| 4,277,583 | 7/1981 | Waitkus | 525/423 |
| 4,283,521 | 8/1981 | Jones | 528/322 X |
| 4,366,302 | 12/1982 | Gounder et al. | 528/114 X |

*Primary Examiner*—Earl A. Nielsen
*Attorney, Agent, or Firm*—Walter J. Monacelli

[57] ABSTRACT

The resins described herein are polyimide-epoxy thermoset resins prepared by reacting a polyepoxide with a solution of an admixture of a polyimide dianhydride with another polyimide component, either a polyimide dianhydride or a polyimide diamine, at least one of which polyimide components is insoluble in the particular solvent in the absence of the other polyimide component or components. "Polyimide dianhydride" is an anhydride-terminated polyimide and "polyimide diamine" is an amine-terminated polyimide as represented by the respective formulas:

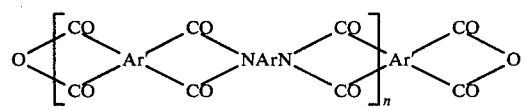

and

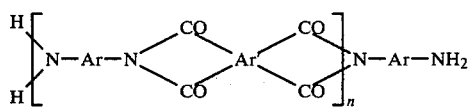

wherein Ar', Ar and n are as defined hereinafter. For use in the present compositions, the polyimide dianhydride has an anhydride activity of at least 0.17 as defined herein, and the ratio of epoxy equivalent to anhydride plus amine equivalents is at least 1/1. By employing a two step reaction scheme, the process offers a more tractable polyimide-epoxy intermediate resin that can be processed into void-free products with superior mechanical properties than polyimide-epoxy thermosets shown in the prior art.

16 Claims, No Drawings

POLYIMIDE-EPOXY THERMOSET RESINS

BACKGROUND OF THE INVENTION

1. Field of the Invention

The invention relates to the preparation of polyimide-epoxy thermoset resins. More specifically, it relates to the reaction products of a polyepoxide with a solution of a soluble admixture of a polyimide dianhydride or a polyimide diamine, one of said polyimide compounds being insoluble in that particular solvent in the absence of the other polyimide compound. The polyimide dianhydride used has a relative anhydride reactivity of at least 0.17 and a ratio of epoxy equivalents to anhydride equivalents of at least 1/1. Still more specifically, a two step reaction is used which offers a more tractable polyimide-epoxy intermediate resin that can be processed into void-free products with superior mechanical strength than previously obtained polyimide-epoxy thermoset resins. Even more specifically, this invention relates to such polyimide-epoxy resins suitable for use as coatings, and the preparation of laminates therefrom suitable for various high temperature applications.

2. State of the Prior Art

The industrial applications of polyepoxides cured with agents such as cyclic anhydrides and polyamino compounds have been known since the early 1950's (see H. Lee and K. Neveille Ed. "Handbook of Epoxy Resins", McGraw-Hill, Inc., 1967, Chapters 1 and 5, and the references therein).

The amine-epoxy addition reaction requires the presence of a hydrogen donor. The primary amine can usually react with two epoxy groups if the resulting secondary amine derived from the primary amine-epoxy reaction does not possess too much steric hinderance. However, the teriary amines generated by the reaction of two epoxy groups with a primary amine are known to be ineffective catalysts for further epoxy reactions. It is also known that the cyclic anhydride-epoxy reaction in the presence of a catalyst can proceed at temperatures as low as 25° C., even though more moderate temperatures such as 60°-80° C. or higher are usually employed. The reaction of cyclic anhydride with epoxy groups usually starts with the formation of a half ester, a carboxylic acid and a nascent hydroxyl group. The carboxylic acid and the nascent hydroxyl group can react further with the excess epoxy groups through esterification and etherification. The reaction of carboxylic acid with the epoxy groups usually starts at moderate temperatures such as 80° C.–100° C. or higher, whereas the etherification requires not only higher temperatures, that is above 120° C., but also a high epoxy-/anhydride ratio and strongly acidic conditions. When a Lewis base is present, the etherification can be excluded completely even at temperatures greater than 120° C., even up to 150° C.

The thermal stability of cyclic anhydride or polyamino compound cured polyepoxide can be expected to increase if the thermal stability of the curing agent is increased by using thermally stable moieties for carrying the required reactive functionality. One of the most logical moieties of this kind is a reaction product of an aromatic diamine with an aromatic dianhydride, i.e., an aromatic polyimide moiety.

The attempt to introduce an aromatic polyimide moiety into an epoxy thermoset resin however, is confronted with several difficulties. First, the tractability of an aromatic polyimide moiety is usually very low unless it possesses several flexible linkages such as —O—,

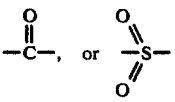

between the aromatic moieties being employed.

For instance, a polyimide derived from 3,4,3',4'-benzophenonetetracarboxylicdianhydride (BTDA) and an oxydianiline

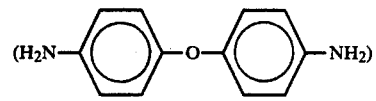

has a glass transition temperature of about 290° C. whereas that of the BTDA and a 1,3-di(3-aminophenoxy) benzene has a glass transition temperature of about 270° C. Due to the very high cohesive energy density of these aromatic polyimides, the glass transition temperatures are not dependent to any large extent on their degree of polymerization. Therefore, their tractability will not be improved significantly by lowering the molecular weight. Secondly, the compatibility between the aromatic polyimides and the polyepoxides is generally very poor due to the large difference of their solubility parameter or cohesive energy density. Since the curing reactions of epoxy with anhydride and epoxy with amine usually start at temperatures of 60° C. to 160° C. which are well below the softening temperature of the aromatic polyimides, which is generally above 200° C., the reaction of the polyepoxide with the unfused polyimide-anhydride or polyimide-amine will usually form a thermoset coating on the particulated polyimide and prevent further epoxy-dianhydride or epoxy-amine reaction inside the polyimide particles. It is thus easy to see that even if the degree of polymerization of the anhydride-end capped or amine end-capped polyimide is equal to 3, it is almost impossible to make any well reacted copolymeric products of thermoset polyimide-epoxy resin without the advantage of a good solvent for both the polyepoxide and the polyimide compounds.

It has been found that many of the polyimide diamines and polyimide dianhydrides are not sufficiently soluble for suitable reaction between the polyepoxide and the functional groups in the polyimide compound. It is considered that a polyimide compound having a solubility in a particular solvent of less than 5% by weight is "insoluble" for the purpose of this invention. As described hereinafter, it is possible to improve the solubility of such insoluble polyimide components so that they can react favorably with polyepoxides. For preparing laiminates and coatings it is generally desirable to have concentrations of 20% or more.

U.S. Pat. No. 3,663,651 implies that it is possible to make a thermoset PIM-Epoxy resin by reacting polyepoxide with some polyimide dianhydrides derived from pyromellitic or benzophenonetetracarboxylic dianhydride. This prior art also does not teach the process for practicing the present invention of forming such reaction products since only few of these benzophenonetetracarboxylic dianhydride oligomers are soluble and none of them are fusible at a temperature of 200° C.

Throughout the teaching and working examples of this patent, there is no teaching of a process for forming a soluble reaction polyimide product in the proclaimed solvent systems, such as dimethylformamide (DMF) or N-methyl-2-pyrrolidone (NMP) and an anhydride activity above 0.17. Furthermore, it has been found that when any polyimide dianhydride is prepared using DMF as solvent, there is no detectable anhydride absorption peak (1840 cm$^{-1}$) in the product's infrared spectrum whereas an identical preparation in phenol or m-cresol gives a product with a substantial absorption at 1840 cm$^{-1}$.

The reason for this failure to produce polyimide dianhydrides with high anhydride reactivity ($I_R$) when these solvents are used is not known, but it is suspected that there is a reaction occurring between the anhydride groups and these solvents during imidization at high temperatures. As has been found, a complete imidization in these solvents usually requires temperatures above 160° C. (but still below 170° C.) for several hours. It is quite possible that the DMF, as well as related solvents containing N-alkylated amide groups, react with the anhydride groups through amidization. This results in intermediates which have low anhydride activity, defined as $I_R$ herein. However, whatever the reason, it has been found impossible to prepare well reacted polyimide-epoxy thermoset resins from a polyimide dianhydride which is prepared in DMF or a related solvent under known processes.

U.S. Pat. No. 4,277,583 describes the reaction of amine-terminated polyimides with polyepoxides. While reference is made to the fact that these reactions may be performed in the presence of a solvent in which the aromatic polyimide is soluble, Examples VII-XI, XIII, XIV and XVI show coreaction of intimate mixtures of the solid reactants. Examples XII describes the reaction as conducted in a DMF solution containing 21.38 g. of amine-terminated polyimide in 75 ml. of DMF together with 3.4 g. of Epon 828. Example XVI is a repetition of Example XII using a different polyepoxide. There is no teaching in this reference of how to conduct a reaction of a polyepoxide in solution with a polyimide component which is insoluble in the particular solvent being used. This is particularly important because of the more thorough and complete reaction effected in solution and also because of the number of polyimide diamines and dianhydrides which are insoluble or poorly soluble.

A problem encountered when an anhydride-terminated polyamic acid is used for preparing a polyimide-epoxy thermoset laminate is that delamination occurs when the molding or post-curing temperature is above 180° C. This is particularly important in view of the fact that high molding temperatures of this kind (above 180° C.) are required to complete cyclization to imide groups and a complete curing of polyimide-epoxy thermoset resin. When the polyamic type laminates are cured at temperatures below 180° C., the laminates usually have poorer properties as compared with those prepared from a polyimide dianhydride which is free from polyamic acid groups. Imidization in a good solvent requires temperatures from 120°-160° C. with the final few percent of imidization in the solid state requiring temperatures above 160° C. It is thus possible that trapped volatile product, that is H$_2$O from imidization, introduces flaws or creates delaminations during molding of these laminates or during later applications when the laminate is being exposed to temperatures above 160° C.

It is important therefore, that the method, including the solvent used for preparing the polyimide dianhydride, is one that produces these intermediates with a high anhydride activity ($I_R$). The high $I_R$, good solubility and low fusion temperatures are desirable for good subsequent reaction with a polyepoxide.

In this field of polyimides there are a number of terms which are commonly used, such as "degree of polymerization" (DP), "molar ratio of monomers" ($r_m$), "statistical average of structure reoccurrence" (n), "degree of imidization" (C), "relative reactivity" ($I_R$), and the "ratio of epoxy equivalents to anhydride equivalents". These are defined as follows.

The Molar Ratio of starting monomers is represented as $r_m$ or X/Y, with X representing moles of diamine and Y the moles of dianhydride.

Degree of Polymerization (DP)-Polyimides may be prepared by reacting X moles of diamine with Y moles of dianhydride. To produce an anhydride-terminated polyimide, Y is greater than X. The statistical average "degree of polymerization" (DP) may be calculated on the basis that the formation of the intermediate amic acid groups is completed by the relatively long reaction periods used (at least 3 hours) as compared to the relatively short time for amic acid formation (about 30 minutes). Therefore:

$$DP = (1 + r_m)/(1 - r_m)$$

Statistical Average of Structure Reoccurrence (n) is equal to:

$$(DP - 1)/2 = r_m/(1 - r_m)$$

For example, where $r_m$ is 0.5 and DP is 3, then n is 1.

Degree of Imidization (C) is equal to the amount of water distilled from the reaction divided by the amount of water theoretically to be removed by complete imidization. This is equal to $(2n \times 18)$ grams for making one gram mole of polyimide.

Relative Reactivity ($I_R$) is the ratio of the intensity peak ratio of the absorption peak of the anhydride group at 1840 cm$^{-1}$ to that of the imide group at 1790 cm in the Infrared Spectrum of the polyimide.

Equivalents Ratio of epoxy to anhydride (R) is:

$$R = (\text{No. of equivalent weights of polyepoxide})/(\text{No. of equivalent weights of dianhydride})$$

wherein the number of equivalent weights of a component is the weight of the component divided by the equivalent weight of the component.

With regard to U.S. Pat. No. 3,663,651, repetition of its working examples gives no detectable anhydride absorption peak (1840 cm$^{-1}$) in its infrared spectrum. This means that the anhydride activity ($I_R$) is practically zero. As discussed above, this is believed to be because of reaction between the anhydride groups and DMF.

In producing thermoset products of good properties from polyimide dianhydrides and polyepoxides, it is found to be important that the polyimide dianhydride has sufficient solubility in an anhydride-inert solvent. Many of the anhydride-terminated or amine-terminated polyimides do not have sufficient solubility to give satisfactory reaction with polyepoxides for production of void-free molded products and good laminated products. For this purpose it is considered that preferred minimum solubility is that in which one gram of the polyimide is completely dissolved in 4 ml. of the solvent when heated at 165° C. with occasional stirring for 5 minutes.

One of the objectives of this invention over the prior art is the discovery of a process for producing polyimide-epoxy resin which can be cured into void free products with superior mechanical properties. Another objective of this invention is to provide soluble polyimide-epoxy resins derived from amine-endcapped or anhydride-endcapped polyimides suitable for lamination or other coating applications. Another objective of this invention is to provide anhydride-endcapped polyimide with high anhydride reactivity yielding superior polyimide-epoxide thermoset resins. Furthermore, another objective of this invention is to provide a processing scheme for making polyimide-epoxy intermediate resins which will not only have excellent solubility but also good tractability, and thus these intermediate resins can be cured and are suitable for laminating or other coating applications, or they can be molded into other shaped products with or without reinforcing fibers or fillers, enabling use of low curing temperatures in conjunction with low curing pressure and a short curing cycle. Still another objective is to convert amine-endcapped and anhydride-endcapped polyimides, which are poorly adapted to produce good products with polyepoxides because of their poor solubility, to polyepoxide reaction products of excellent products.

STATEMENT OF THE INVENTION

In accordance with the present invention it has been found that a polyepoxide reaction can be effectively reacted in solution with a polyimide dianhydride or polyimide diamine which is insoluble or has less than the desired solubility for satisfactory reaction with the polyepoxide by having the insoluble polyimide component made soluble by admixture with a soluble polyimide component, either a polyimide dianhydride or a polyimide diamine, at least one of which components is a polyimide dianhydride. The polyimide dianhydrides are represented by the formula:

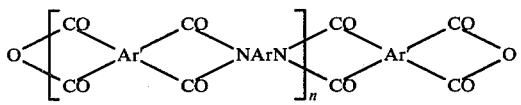

and the polyimide diamines are represented by the formula:

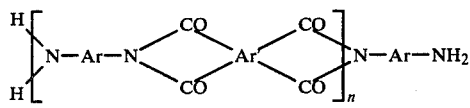

in which formulas Ar' is a tetravalent aromatic organic radical, the four carbonyl groups being attached directly to separate carbon atoms and each pair of carbonyl groups being attached to adjacent carbon atoms in the Ar' radical except that in the case of the Ar' being a naphthalene radical one or both pairs of the carbonyl groups may be attached to peri carbon atoms; Ar is a divalent aromatic radical and n is an integer of at least one, preferably 1–20.

It has been found that the polyimide dianhydride component or components in the mixture should have a high anhydride activity ($I_R$) namely at least 0.17 as measured by its infrared spectrum. For the purpose of this invention, it is considered that a polyimide diamine or dianhydride is not sufficiently soluble if the polyimide component is not dissolved in the particular solvent upon heating 1 g. of the component in 4 ml. of the solvent at a temperature of 167° C. for 5 minutes. The amount of soluble component to be added to impart sufficient solubility to the insoluble component will depend on the respective components. Generally, however, 35–85%, preferably 50–85% of the soluble component based on the combined weight of these components will effect this result. In any particular case it is imperative that there is a polyimide dianhydride having an $I_R$ of at least 0.17 present either as the soluble or previously insoluble component.

Polyimides containing a particular monomer, or possessing a particular recurring structure, can have some superior mechanical properties or thermal stability. For instance, a polyimide derived from 4,4'-methylenedianiline (MDA) and 3,3'4,4'-benzophenonetetracarboxylic dianhydride (BTDA) has better mechanical properties (flexural, tensile strength) than one derived from 2,4-toluenediamine and BTDA. Also, a polyimide derived from pyromellitic dianhydride (PMDA) and oxydianiline (ODA) will have better thermal stability than one derived from BTDA and oxydianiline. However, it is also known that neither of the MDA/BTDA or the PMDA/ODA oligomer dianhydrides nor the corresponding diamines are soluble to the desired extent or fusible below 200° C. When a structurally desired oligoimide diamine or dianhydride is not sufficiently soluble or fusible, the production of good polyimide-epoxy thermoset products is difficult or impossible.

This invention enables the insoluble polyimide to be made suitably soluble for more effective reaction with a polyepoxide. The improvement over the prior art of this invention is the addition of soluble polyimide to an insoluble polyimide to bring the whole mixture (the previously insoluble polyimide and the soluble polyimide) completely into solution so that reaction then takes place rapidly thereafter. Using this technique, for instance, an insoluble polyimide diamine or dianhydride can become soluble and react with polyepoxide when one or more soluble polyimide dianhydride(s) and/or diamine(s) is admixed therewith and brought into solution.

When this technique is used, a critical requirement for obtaining acceptable polyimide-epoxy products, in addition to the appropriate selection of certain polyimides, is that the employed equivalents ratio of epoxy to carboxylic acid, $R_B$, is preferably to be no less than 1/1.

When the block copolyimide technique is employed, the molar ratio of the sum of the polyimide dianhydride to that of the polyimide diamine is defined as $r_o$. The $r_o$ can be smaller, equal to or larger than 1/1, depending on the makeup of the block copolyimide desired. In case the $r_o$ is less than one, the block copolyimide is thus a diamine end-capped block copolyimide-amic acid. This intermediate product is new and distinct from the prior art. The use of the block copolymerization method of this invention can achieve some unusual desirable properties such as solubility, reactivity and superior mechanical properties.

The particular method of preparing the polyimide component is not critical so long as it gives the desired polyimide structure and the desired functionality of diamine or dianhydride groups, with the dianhydride having an $I_R$ of at least 0.17. In any case, the method of preparing the polyimide dianhydride should be such that it does not destroy the activity of the anhydride groups below the 0.17 level.

When a polyimide dianhydride (C=1) is prepared using the so-called "inert solvent" such as the N,N-dialkylcarboxyl amide class compound recommended by U.S. Pat. No. 3,663,651, the anhydride relative reactive ratio $I_R$ is usually less than 0.17 and the polyamide dianhydride of this kind usually gives products with either very poor mechanical properties or delamination occurs right after mold release. Also, when a polyimide dianhydride also containing substantial amounts of amic acid (such as where C is 0.9 or less) is used, a resin product with moderate mechanical properties is obtained only if the equivalent ratio of epoxy to anhydride is higher than 2/1, so as to give enough epoxy groups to react with the carboxylic acid groups.

Moreover, it should be pointed out that when a polyimide dianhydride has a degree of imidization of less than 1.0 as illustrated in U.S. Pat. No. 3,663,651, it is unrealistic to calculate the equivalents ratio based only on the epoxy and anhydride concentration. As is well known in the art, the carboxylic acid present in an unimidized polyamic acid has an equivalent reactivity toward the epoxy group as does the anhydride group. However, the anhydride group has a functionality of two, whereas the carboxylic acid has a functionality of one. It is thus more reasonable to recalculate the required amount of epoxy for reaction with a polyimide dianhydride which contains also amic acid, based on the equivalent "epoxy" to "carboxylic acid" ratio. It is necessary to have this ratio at least equal to 1/1 in order to obtain void-free polyimide-epoxy thermoset products. The rationale behind this requirement is that when polyamic acids are present, unless enough epoxy is used to react with the carboxylic acids, these polyamic acids will eventually be imidized under curing conditions, or during later exposure to higher temperatures in applications, and thus create flaws or even delamination by the released water vapor.

The polyimide dianhydrides used in the process of this invention may be prepared by using a molar excess of an aromatic dianhydride with an aromatic diamine to form oligomeric or higher molecular weight polyimides. The amine-terminated polyimides used in the process of the present invention are prepared by using a molar excess of an aromatic diamine with an aromatic dianhydride to form oligomeric or higher molecular weight polyimides. The aromatic dianhydride has the formula:

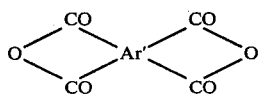

wherein Ar' is a tetravalent aromatic organic radical, preferably containing at least one ring of six carbon atoms, said ring being characterized by benzenoid unsaturation, the four carbonyl groups being attached directly to separate carbon atoms and each pair of carbonyl groups being attached to adjacent carbon atoms in the Ar' radical except that when Ar' represents a naphthalene radical, one or both pairs of carbonyl groups may be attached to peri carbon atoms.

The aromatic diamines useful in these polyimide preparations are represented by the formula H$_2$N—Ar—NH$_2$ wherein Ar is a divalent aromatic organic radical.

In preparing the anhydride-terminated and amine-terminated polyimides, any of the aromatic tetracarboxylic acid dianhydrides known in the prior art can be used. Among the useful dianhydrides are 3,3',4,4'-benzophenonetetracarboxylic acid dianhydride, pyromellitic dianhydride, 2,3,6,7-naphthalene tetracarboxylic acid dianhydride, 1,4,5,6-naphthalenetetracarboxylic dianydride, 3,3'4,4'-diphenyl tetracarboxylic acid dianhydride, 1,2,5,6-naphthalene tetracarboxylic acid dianhydride, 2,2'3,3'-diphenyl tetracarboxylic acid dianhydride, 2,2-bis(,4-dicarboxyphenyl) propane dianhydride, 3,4,9,10-perylene tetracarboxylic acid dianhydride, bis(3,4-dicarboxyphenyl) ether dianhydride, naphthalene-1,2,4,5-tetra-carboxylic acid dianhydride, naphthalene-1,4,5,8-tetra-carboxylic acid dianhydride, decahydronaphthalene-1,4,5,8-tetracarboxylic acid dianhydride, 4,8-dimethyl-1,2,3,5,6,7-hexahydronaphthalene-1,2,5,6-tetracarboxylic acid dianhydride, 2,6-dichloronaphthalene-1,4,5,8-tetracarboxylic acid dianhydride, 2,7-dichloronaphthalene-1,4,5,8-tetracarboxylic acid dianhydride, 2,3,6,7-tetrachloronaphthalene-1,4,5,8-tetracarboxylic acid dianhydride, phenanthrene-1,8,9,10-tetracarboxylic acid dianhydride, cyclopentane-1,2,3,4-tetracarboxylic acid dianhydride, pyrrolidine-2,3,4,5-tetracarboxylic acid dianhydride, pyrazine-2,3,5,6-tetracarboxylic acid dianhydride, 2,2-bis(2,3-dicarboxyphenyl) propane dianhydride, 1,1-bis(2,3-dicarboxyphenyl) ethane dianhydride, 1,1bis(3,4-dicarboxyphenyl) ethane dianhydride, bis(2,3-dicarboxyphenyl) methane dianhydride, bis(3,4 dicarboxyphenyl) methane dianhydride, bis(3,4-dicarboxyphenyl sulfone dianhydride, and benzene 1,2,3,4-tetracarboxylic acid dianhydride. The first three mentioned dianhydrides are preferred.

In preferred dianhydrides, the Ar' group has one of the formulas

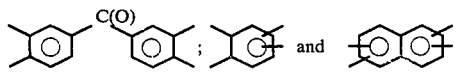

In the last formula the members of each pair of valence bonds are on separate carbon atoms either adjacent to or in peri positions to each other. In the various formulas positions not occupied by the valence bonds shown are occupied by hydrogen or groups inert to the various reactions conducted in accordance with this invention and may be alkyl, such as methyl, ethyl, etc. or halogen such as chlorine, etc.

Aromatic diamines useful in preparing the starting polyimides have the formula:

NH$_2$—AR—NH$_2$ wherein Ar is a divalent aromatic organic radical. Preferred aromatic diamines are those wherein Ar is a divalent benzenoid radical selected from the group consisting of:

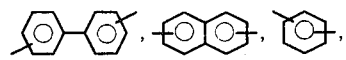

and multiples thereof connected to each other by R''', e.g.:

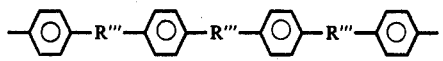

wherein R''' is —CH=CH—,

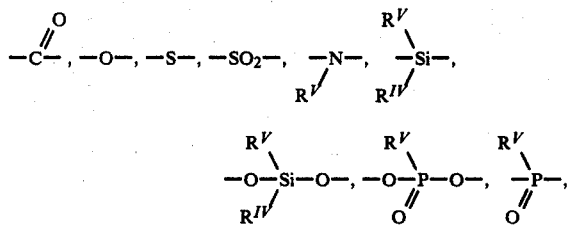

or an alkylene chain of 1–3 carbon atoms, wherein $R^V$ and $R^{IV}$ are each selected from the group consisting of alkyl and aryl radicals containing one to six carbon atoms, e.g., methyl, ethyl, hexyl, n-butyl, i-butyl and phenyl.

In the above formulas for Ar, positions not occupied by the valence bonds shown are occupied by hydrogen or groups inert to the various reactions conducted in accordance with this invention and may be alkyl, such as methyl, ethyl, etc. or halogen, such as chlorine etc. For example, the group

is intended to include:

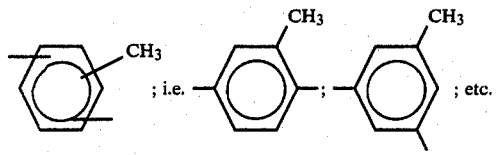

Examples of the aromatic diamines which are suitable for use in the present invention are 4,4'-diaminodiphenyl propane, 4,4'-diaminodiphenyl methane, benzidine, 3,3'-dichlorobenzidine, 4,4'-diaminodiphenyl sulfide, 3,3'-diamino-diphenyl sulfone, 4,4'-diamino-diphenyl sulfone, 4,4'-diamino-diphenyl diphenylsilane, 4,4'-diamino-diphenyl ethyl phosphine oxide, 4,4'-diamino-diphenyl phenyl phosphine oxide, 4,4'-diamino-diphenyl N-methyl amine, 4,4'-diamino-diphenyl N-phenyl amine and mixtures thereof, 3,3'-dimethyl-4,4'-diaminodiphenylmethane, 3,3'-diethyl-4,4'-diaminodiphenylmethane, 3,3'-dimethoxy-4,4'-diaminodiphenylmethane, 3,3'-diethoxy-4,4'-diaminodiphenylmethane, 3,3'-dichloro-4,4',4,4'-diaminodiphenylmethane, 3,3'-dibrome-4,4'-diaminodiphenylmethane, 3,3'-dicarboxy-4,4'-diaminophenylmethane, 3,3'-dihydroxy-4,4'-diaminophenylmethane, 3,3'-disulpho-4,4'-diaminodiphenylmethane, 3,3'-dimethyl-4,4-diaminodiphenylether, 3,3'-diethyl-4,4'-diaminodiphenylether, 3,3'-dimethoxy-4,4'diaminodiphenylether, 3,3'-diethoxy-4,4'-diaminodiphenylether, 3,3'-dichloro-4,4'-diaminodiphenylether, 3,3'-dibrome-4,4'diamino diaminodiphenylether, 3,3'-dicarboxy-4,4'-diaminodiphenylether, 3,3'-dihydroxy-4,4'-diaminodiphenylether, 3,3'-disulfo-4,4'-diaminodiphenylether, 3,3'-dimethyl4,4'-diaminodiphenylsulfide, 3,3'-diethyl-4,4'-diaminopdiphenylsulfide, 3,3'-dimethoxy-4,4'-diaminodiphenylsulfide, 3,3'-diethoxy-4,4'-diaminodiphenylsulfide, 3,3'-dichloro-4,4'-diaminodiphenylsulfide, 3,3'-dibromo-4,4'-diaminodiophenylsulfide, 3,3'-dicarboxyl-4,4'-diaminodiphenylsulfide, 3,3'-dihydroxy-4,4'-diaminodiphenylsulfide, 3,3'-disulfo-4,4'-diaminodiphenylsulfide, 3,3'-dimethyl-4,4'-diaminodiphenylsulfone, 3,3'-diethoxy-4,4'-diaminodiphenylsulfone, 3,3'-dichloro-4,4'-diaminodiphenylsulfone, 3,3'-dicarboxy-4,4-diaminodiphenylsulfone, 3,3'-dihydroxy-4,4'-diaminodiphenyl-sulfone, 3,3'-disulfo-4,4'-diaminodiphenylsulfone, 3,3'-diethyl-4,4'-diaminodiphenylpropane, 3,3'-dimethoxy-4,4'diaminodiphenylpropane, 3,3'-dichloro-4,4'-diaminodiphenylpropane, 3,3'-dicarboxy-4,4'-diaminodiphenylpropane, 3,3'-dihydroxy-4,4'-diaminodiphenylpropane, 3,3'-disulfo-4,4'-diaminodiphenylpropane, 3,3'dimethyl-4,4'-diaminobenzophenone, 3,3'-dimethoxy-4,4'-diaminobenzophenone, 3,3'-dichloro-4,4'-diaminobenzophenone, 3,3'-dibromo-4,4'-diaminobenzophenone, 3,3'-dicarboxy-4,4'-diaminobenzophenone, 3,3'-dihydroxy-4,4'-diaminobenzophenone, 3,3'-disulphodiaminobenzophenone, 3,3'-diaminodiphenylmethane, 3,3'-diaminodiphenylether, 3,3'-diaminodiphenylsulfide, 3,3'-diaminodiphenylsulfone, 3,3'-diaminodiphenylpropane, 3,3'-diaminobenzophenone, 2,4-diaminotoluene, 2,4-diaminotoluene, 1-isopropyl-2,4-phenylenediamine, 2,4-diaminoanisole, 2,4-diaminomonochlorobenzene, 2,4-diaminofluorobenzene, 2,4-diamino-benzoic acid, 2,4-diaminophenol and 2,4-diaminobenzenesulfonic acid and phenylene diamines. Preferred diamines are 4,4'-oxy-dianiline, 4,4'-sulfonyldianiline, 4,4'-methylene dianiline, 4,4'-diaminobenzophenone, 4,4'-diaminostilbene and the phenylene diamines.

While the polyimide starting materials may be made from aromatic dianhydrides and aromatic diamines as described above, it is also possible to prepare the polyimides by other methods, such as for example reacting the dianhydrides with aromatic polyisocyanate compounds, preferably aromatic diisocyanates. Suitable polyisocyanates are those in which the amine groups of the above enumerated aromatic diamines have been replaced by isocyanate groups. Preferred diisocyanates are toluene diisocyanate, diphenyl diisocyanate, diphenyloxide diisocyanate, naphthalene diisocyanate, etc. In this alternative method, the polyimide dianhydride is prepared by using a molar excess of the starting aromatic dianhydride with the diisocyanate. Polyimide diamines are prepared by first preparing the polyimide dianhydride and then reacting the dianhydride product with a molar amount of an aromatic diamine, as described above, to convert the polyimide dianhydride to the corresponding diamine.

The polyimide starting materials used in the process of this invention may be prepared conveniently by the method shown in U.S. Pat. Nos. 3,897,395 and 4,058,505 by reacting the dianhydride with the diamine in a phenol solvent of the formula $(R')_2C_6H_3OH$. where each $R'$ is hydrogen, halogen or a methyl radical in the presence of certain organic azeotroping agents, particularly cyclic hydrocarbons of 6 to 8 carbon atoms and most preferably benzene or toluene until most of the water of reaction is eliminated. The reaction temperature is less than 140° C. and also should be below the boiling point of the phenol used but higher than the boiling point of the azeotroping agent. The vapor phase temperature lies between that of the water azeotrope and no higher than 95° C. As the water of reaction and azeotroping agent are removed from the reaction mixture, quantities of the azeotroping agent are returned to the reaction mixture so as to maintain the temperature and reaction mixture volume substantially constant. It is preferred that the process be continuous with continuous removal of water and continuous return of azeotroping agent. This is conveniently done by the use of a conventional Dean-Stark trap and condenser wherein after the azeotrope condenses, the water preferably sinks to the bottom of the trap for subsequent removal and the azeotroping agent overflows the trap and returns to the reaction mixture. Initially the trap is filled with azeotroping agent.

Typical examples of the phenol solvent are phenol, o-cresol, p-cresol, m-cresol, o-chlorophenol, m-chlorophenol, p-fluorophenol, 2,4,6-tribromophenol. The most desirable phenol solvent should have a melting temperature below about 80° C., preferably 60° C., such as phenol (m.p.—35° C.), o-cresol (m.p.—30°-32° C.), m-cresol (liquid at 25° C.), etc. Other inert solvents such as dimethylsufoxide, sulfolane, etc. are rather poor solvents as compared with the phenol solvents mentioned above but can still be used in some cases.

When a poor solvent is used, the imidization often cannot be completed at temperatures below 170° C. due to the precipitation of the polyimide. The so-called "inert solvent", the N,N-dialkylcarboxylamide class compounds, such as dimethylformamide, N-methylpyrrolidone, as suggested by U.S. Pat. No. 3,663,651 is not recommended since dianhydrides prepared using either DMF or NMP as solvent, have very low anhydride reactivity.

The polyimides advantageously are prepared using a monomer molar ratio, $r_m$ less than 1, preferably less than 0.95 but no less than 0.5 in a phenol solvent, in the presence of a Lewis base as catalyst and an azeotroping agent such as toluene until the theoretical amount of water is distilled off the reactor. The reaction requires usually a first stage reaction at temperatures ranging from room temperature to about 80° C., preferably below 60° C. for at least 30 minutes, then a second stage reaction at temperatures ranging from above 100° C. to about 170° C. or below the boiling point of the solvent. The first stage reaction is carried out at the desired temperature to the extent that all the monomers will be reacted. The second stage reaction, or the imidization reaction, commonly starts at temperatures above 115° C., mostly above 125° C., in the presence of Lewis base catalyst, or starts a few degrees higher without the catalyst and completes at temperatures of about 155°-165° C. if the polyimide is soluble. When the polyimide is not soluble, the imidization often will not be completed even at 165° C. for several hours. After the completion of the imidization, the polyimide is precipitated by the addition of an inert non-solvent such as acetone under rigorous stirring. The finely precipitated powder is dried in a vacuum oven at temperatures above 80° C., but no more than 120° C. to remove all absorbed moisture and solvent until constant weight is achieved.

An alternate way for making polyimide is to prepare the poly-amic acid in an inert solvent. Since most of the poly-amic acid is very soluble, some low boiling solvent such as chloroform, tetrahydrofuran, DMF or even acetone and the admixture thereof can be used. In practice, any inert solvent under the reaction temperature range can be employed. After the formation of the polyamic acid by rigorous mixing of the homogeneous solution at temperatures from 25° C. to 60°-80° C. for more than 30 minutes, the product is then freed from the solvent. The dried poly-amic acid is heated slowly in a vacuum oven or in a heater fluxed with inert gas, such as nitrogen, from about 80° C. to 200° C. until the theoretical amount of water is removed to produce the polyimide.

For the production of the resins of this invention, polyepoxide compounds having at least two epoxy or oxirane groups are used. These have two or more oxirane moieties therein represented by the structure:

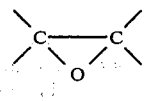

characterized by having an oxygen atom attached to two adjacent carbon atoms. The polyepoxide may possess as high as ten or twenty or even a hundred or more oxirane moieties or structures as in the case of the polyglycidyl acrylates and methacrylates.

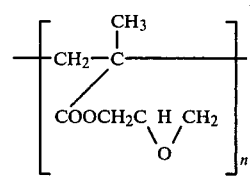

prepared by the procedure given in the Journal of Macromolecular Science-Chemistry, A3(5), 1207 (1969). The polyepoxide reactants suitable for use in the preparation of the copolymers of this invention are essentially unlimited.

The particular polyepoxide selected for use will depend on such factors as the properties desired in the polymer, cost, reactivity, commercial availability and on practical as well as theoretical considerations. The polyepoxides can be saturated, unsaturated, aliphatic, cycloaliphatic, aromatic and heterocyclic, and can be written as:

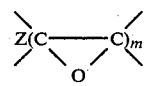

wherein m is a numerical value of at least two and Z is a polyvalent organic radical whose valency corresponds to m and is selected from aliphatic and aromatic structures such as alkylene, substituted alkylenes, alkyleneoxy, alkenylene, substituted alkenylene, arylene, substituted arylene, aliphatic and aromatic amindes, imides, esters, ethers and the like. Generally it is not necessary for m to have a value of more than 20. Moreover, the unoccupied valencies of the above formula may be attached to hydrocarbon groups or a plurality of such groups may be joined together such as epichlorohydrin adducts of polyols and particularly by ether, esters, keto groups, etc.

Useful polyepoxides include glycidyl ethers derived from phenols, especially HOArOH wherein Ar is as previously defined. A particularly suitable epoxide is the diglycidyl ether of bisphenol A of the formula:

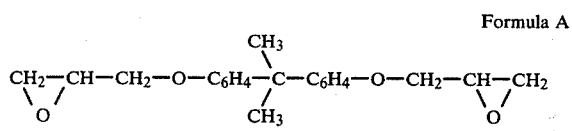
Formula A

Additional examples of other polyepoxides are: resorcinol diglycidyl ether; 3,3-epoxy-6-methylcyclohexylmethyl-9,10-epoxystearate,1,2-bis(2,3-epoxy-2-methylpriopoxy)ethane, the diglycidyl ether of 2,2-(p-hydroxyphenyl)propane, butadiene dioxide, dicyclopentadiene dioxide, pentaerythritol tetrakis(3,4-epoxy-cyclohexanecarboxylate), vinylcyclohexene dioxide, divinylbenzene dioxide, 1,5-pentadiol bis(3,4-epoxycyclohexanecarboxylate), ethylene glycol bis(3,4-epoxycyclobezanecarboxylate), 2,2-diethyl-1,3-propanediol bis(3,4-epoxycyclohexanecarboxylate), 1,6-hexanediol bis(3,4-epoxycyclohexanecarboylate), 2-butene-1,4-diol bis(3,4-epoxy-6-methylcyclohexanecarboxylate), 1,1,1-trimethylolpropane tris(3,4-epoxycyclohexanecarboxylate), 1,2,3-propanetriol tris(3,4-epoxycyclohexanecarboxylate), dipropylene glycol bis(3-ethylexyl-4,5-epoxycyclhexane-1,2-dicarboxylate), diethylene glycol bis(3,4-epoxy-6-methylcyclohexanecarboxylate), triethylene glycol bis(3,4-epoxycyclohexanecarboxylate), 3,4-epoxycyclohexylmethyl, 3,4-epoxycyclohexanecarboxylate, 3,4-epoxy-1-methylcyclohexylmethyl, 3,4-epoxyl-methylcyclohexanecarboxylate, bis(3,4-epoxycyclohexylmethyl)pimelate, bis(3,4-epoxy-6-methylenecyclohexylmethyl)maleate, bis(3,4-epoxy-6-methylcyclohexylmelthyl)succinate, bis(3,4-epoxycyclohexylmethyl)sebacate, bis(3,4-epoxy-6-methylcyclohexylmethyl)adipate, bis(3,4-epoxycyclohexylmethyl)terephthalate; 2,2′-sulfonyldiethanol bis(3,4-epoxycyclohexanecarboxylate), N,N′-ethylene bis(4,4-epoxycyclohexane-1,2-dicarboximide), di(3,4-epoxycyclohexylmethyl)1,3-tolylenedicarbamate, 3,4-epoxy-6-methylcyclohexanecarboxaldehyde acetal, 3,9-bis(3,4-epoxy-cyclohexyl)spirobi(metadioxane),

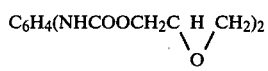

etc.

Another class of suitable polyepoxide reactants comprises the polyglycidyl ether-terminated organic polyhydric alcohols having molecular weights from about 100 to 4,000, and particularly from about 150 to 1,000. The polyhydric alcohols, for example having two or three hydroxy groups, are preferably: poly(oxyalkylene)glycols; alkylene oxide adducts of aliphatic polyols, and polyhydroxy phenolic compounds. The alkylene groups of the poly(oxyalkylene)glycols and alkylene oxides can have from two to four carbon atoms, and particularly from two or three carbon atoms. The poly(glycidyl ether) terminated polyhydric alcohols (polyols) can be represented by the formula:

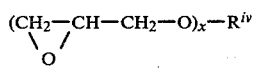

wherein x is an integer such as two or three and $R^{iv}$ represents the polyol residue after removal of terminal hydroxy groups. The diglycidyl ether of bis-phenol A is a satisfactory example of such polyepoxides, as shown in the formula given hereinabove. Illustrative of other polyglycidyl ethers of polyols of the above formula, there can be mentioned those prepared by the reaction of about two moles of epichlorohydrin with one mole of a polyethylene glycol or polypropylene glycol having a molecular weight of 200, 400 or 800, or with one mole of tetramethyleneglycol, tetrapropylene glycol and the like, respectively, or about three moles of epichlorohydrin with trimethylol propane or its adducts with ethylene- or propylene-oxide, etc.

Particularly advantageous oxirane compounds to use for the present invention are the epoxy-terminated polyimides disclosed in U.S. Pat. No. 4,026,904 having as terminal groups:

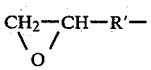

radicals wherein R′ is a divalent aromatic radical such as phenylene and other divalent benzenoid radicals listed above as suitable for the Ar radical of diamines used in preparing the polyimides. By using such epoxy-terminated polyimides with the amine-terminated polyimides, the resulting copolymers comprise predominantly or substantially all polyimide structure.

Also suitable for this purpose are Novolac resins to which an appropriate number of glycidyl groups or other oxirane radicals have been attached and represented by the formula:

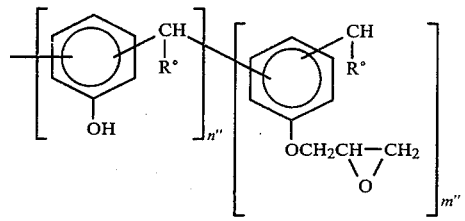

wherein n″ and m″ are integers representing appropriate numbers of hydroxy and oxirane, and R° represents hydrogen or a hydrocarbon radical of 1 to 10, preferably 1 to 6 carbon atoms, e.g., methyl, ethyl, propyl, allyl, butyl, amyl, hexyl, phenyl, cyclohexyl, tolyl, methylcyclohexyl, etc. Where there are only a few benzenoid repeating units, n″ may be zero and all of the hydroxy groups in the Novolac resin may be replaced by oxirane radicals. As the number of benzenoid radicals increases, the relative proportion of oxirane radicals to hydroxyl groups may be decreased in accordance with the desired number of attachments to be made to polyimide molecules. In the Novolac resins substituted benzenoid radicals may also be used as well as polynuclear benzenoid radicals. In the above formulas the sum of the n″ and m″ integers may go as high as 50 or more and when all of the hydroxy groups are substituted by glycidyl groups, n″ will have a value of 0.

Thus such oligomeric oxirane-containing compositions may be represented by the formula:

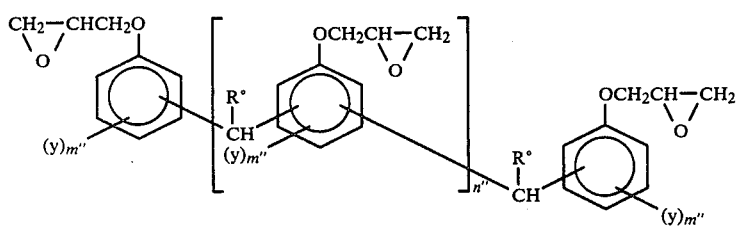
(Formula B)

wherein y represents halogen (e.g. Cl, Br, I or F) or a hydrocarbon radical of 1–18, preferably 1–6 carbon atoms, $n''$ is an integer having a value of 1–50, preferably 1–20, and $m''$ is an integer having a value of 0 to 3. When $m''$ is one, the oligomeric Novolac glycidyl ether will contain three epoxy groups per molecule. The hydrocarbon groups may be alkyl, alkenyl, akynyl, cycloalkyl, and aryl, including alkylaryl, alkenylaryl, cycloalkylaryl, etc. The typical members of these groups are well known and illustrated in the literature. Preferably these are methyl, ethyl, propyl, butyl, amyl, hexyl, etc.

Moreover, in addition to the diglycidyl ether of bisphenol-A described above, various oligomers of this monomer may be used, such as those having the following formula:

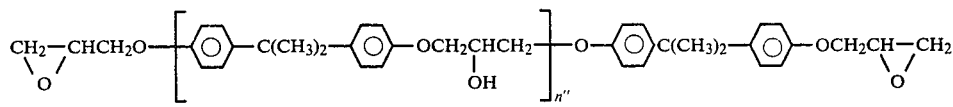

Thus, when $n''$ is zero, the formula reduces to Formula A given hereinabove. Furthermore, the

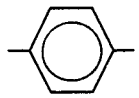

shown in the above formula may be replaced by the

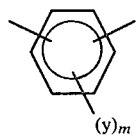

shown in the preceding formula and the —C(CH₃)₂— group may be replaced by methylene, ethylene, ethylidene, propylene, butylene, butylidene groups or oxygen, sulfur, sulfone, or the like.

Additional examples of polyepoxide compounds are given in U.S. Pat. Nos. 3,334,110; 3,341,337; 3,415,901 and 3,440,230 which are hereby incorporated herein by reference thereto.

The preferred epoxies for the practice of this invention, because of their ease of synthesis, availability of intermediates and cost, are the polyepoxides obtained as glycidyl ethers by the reaction of polyhydric phenols, Ar(OH)₂ with epichlorohydrin, the various oligomers of these glycidyl monomeric ethers, and the diycidyl ethers of soluble, fusible phenol-aldehyde resins often referred to as Novolac resins.

Glycidyl ethers based on Ar(OH)₂ have the formula:

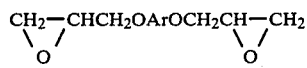

in which some specific examples of Ar are:

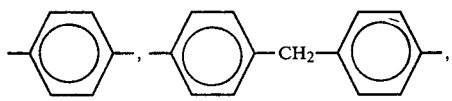

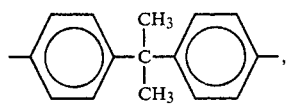

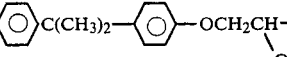

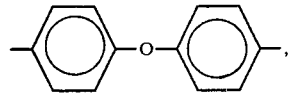

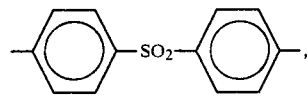

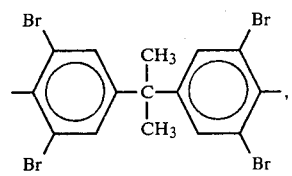

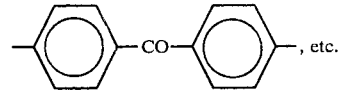, etc.

The oligomers of these glycidyl ethers of dihydric phenols may be represented by the formula:

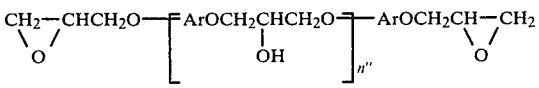

wherein n″ is an integer having a value of 1 to 50 or more, preferably 1 to 10; Ar has the same meaning as given above and as illustrated by the various diamines listed above.

Preferred oxiranes based on the Novolac resins have the structure given above in Formula B, particularly those in which R° is H or $CH_3$.

Reaction of the Polyimide Components with the Polyepoxide

The copolymerization reactions are conducted in solution. The specific solvent will depend on the particular aromatic polyimide used. In most cases the solvent is an aprotic organic compound having a dielectric constant between 35 and 45, preferably one which is water soluble. Representative aprotic compounds are N,N-dimethylformamide, N,N-diethylformamide, N,N-dimethylmethoxyacetamide, N-methyl caprolactam, caprolactam, N,N-dimethylacetamide, N,N-diethylacetamide, dimethyl sulfoxide, N-methyl-α-pyrrolidone, tetramethylurea, hexamethylphosphoramide, tetramethylene sulfone, N,N,N′,N′-tetramethylethylmalonamide, N,N,N′,N′-tetramethyl glutaramide, N,N,N′,N′-tetramethylsuccinamide, thiobis(N,N-dimethylcarbamylmethyl)ether, N,N,N′,N′-tetramethylfuraramide, methylsuccinonitrile, N,N-dimethylcyanoacetamide, N,N-dimethyl-α-cyanopropionamide, N-formylpiperidine and butyrolacetone, etc.

Preferred solvents are dimethylformamide, dimethylacetamide, N-methyl pyrrolidone, dimethyl sufoxide, butyrolactone and caprolactam.

In many cases, non-aprotic solvents can be used. For example, xylene, phenol, anisole, benzonitrile, acetophenone, methylphenylether, methylene chloride, chloroform, carbon tetrachloride or mixtures of these with each other, with the aprotic solvents or with relatively poor solvents such as benzene, toluene cyclohexane, cyclohexane, dioxane, butyl cellosolve and the like.

The copolymer products can be used as prepared in solution or isolated as a solid product by either evaporating the solvent or by use of a precipitating non-solvent for the polymer. Illustrative precipitating liquids, but not limited thereto, are alcohols such as methanol, ethanol, isopropanol, ethylene glycol, propylene glycol; esters such as ethyl formate, ethyl acetate, ethylene glycol diacetate; ethers such as methyl cellosolve, butyl cellosolve, ethyl cellosolve acetate; hydrocarbons such as benzene, toluene, xylene, cyclohexane, cyclohexene; aromatic ethers such as methyl phenyl ether, hydroxy ethyl phenyl ether and water. Water and methanol are preferred.

The copolymer products of this invention may be used in making molded products, laminated products, as impregnants for various materials, wire coatings, etc. Fillers may be added such as fiberglass, carbon fiber, metal fibers, glass cloth, clays, woodflour, mica and other minerals, etc.

While the reaction of the anhydride or amine and oxirane groups proceeds merely upon heating, it is most advantageous generally to use various catalysts such as tertiary amines and other Lewis acids such as triethylamine, tributylamine, pyridine dimethylbenzyl aniline, tribenzylamine, 2,4,6-tris(dimethylaminomethyl)phenol, triphenyl phosphine, etc. These and other curing catalysts are disclosed in the art, such as the epoxy handbooks published by Dow Chemical Company and others. At least 0.1 percent of such catalyst based on total weight of reagents is desirable.

The reaction of the solution of polyimide components with the epoxy groups of the polyepoxide to produce the polyimide-epoxy thermoset resin takes place in two stages: (1) the chain extending stage or the copolymerization; and (2) the curing stage. In order to obtain a tractable polyimide-epoxy intermediate resin, the functionalized imides which can be an admixture of two or more polyimide dianhydrides, or an admixture of one or more polyimide diamines with one or more polyimide dianhydrides, at least one of which components is insoluble as described above. These are first dissolved in a non-toxic, inert solvent at temperatures ranging from room temperature to less than 100° C. (or below the imidization temperature). The solvent used for this stage of reaction is preferably selected from the N,N′-dialkylcarboxylamide class compounds, such as N,N-dimethylformamide, N,N-dimethylacetamide or N-Methyl-Pyrrolidone, etc. The chain extending reaction takes place at temperatures as low as 25° C. and is still controllable sometimes, at temperatures as high as 120°–130° C., depending on the reactivity of the polyimide components. For instance, the viscosity of a 36% solids solution of a polyimide dianhydride will increase from about 50 to 1,000 cps after 4 hours of mixing at 80° C. The corresponding solution of an admixture of a polyimide dianhydride with polyimide diamine using $r_o = 1$, may reach 10,000 cps whereas a polyimide diamine/polyepoxide solution using the same R ratio and solids content will not reach more than 100 cps under the same conditions.

Due to the extremely slow diamine/epoxy reaction under these conditions, the polyimide diamine is preferably used in conjunction with at least one polyimide dianhydride. By using the admixture of polyimide components with various $r_o$ ratios, a controllable economic process is attainable for making polyimide-epoxy thermoset products.

The degree of chain extension or branching, or copolymerization, as indicated by the increase of viscosity, can be, in theory, carried out to the pre-gelling point (10,000 cps in some cases) in order to produce the copolymer of the highest possible molecular weight. In practice, the viscosity of a solution for lamination or other coating applications are desirably in the range of from 100 to 1500 cps, preferably from 300 to 1000 cps. On the other hand, the viscosity of the solution can be as high as several thousand cps when the solution is used for compounding with reinforcing agents or fillers. It should be remembered that the viscosity is not only dependent on the molecular weight, but also on the solids concentration of the solution. Thus the above viscosity ranges, using a solids content of about 30%, should be taken as a guideline, but not an absolute value.

The second stage, or the curing reaction of the polyimide-epoxy intermediate resin takes place after the solvent is freed from the resin. This can be done either by precipitation of the intermediate resin effected by addition of an inert non-solvent, or by evaporation of the solvent at low temperature or under vacuum. For lamination or coating applications, this is usually done after the coating is completed. The solvent is then slowly evaporated at temperature ranges from 25° C. to no more than 100° C.

The curing of the intermediate resins takes place at temperatures above 120° C. to about 200° C., preferably from 160° C. to 180° C. under a pressure from zero to 500 psi for about 1 to 30 minutes, preferably from 5 to 15 minutes, depending on the thickness of the coating or the molded articles.

SPECIFIC EMBODIMENTS OF THE INVENTION

The invention is illustrated by the following examples which are intended merely for purpose of illustration and are not to be regarded as limiting the scope of the invention or the manner in which it may be practiced. Unless specifically indicated otherwise, parts and percentages are given by weight. In the preparation of the anhydride-terminated and amine-terminated polyimides, the continuous azeotropic technique described hereinabove is used.

In the following examples the purity or method of purification of various solvents is as follows:

The N-methyl-2-pyrrolidone (NMP) as sold by GAF Corporation, Chemical Division, has a labeled $T_b=202°$ C. with $n_D^{25}=1.469$. Thus, a 2500 ml round bottom flask containing 1500 ml of NMP is heated to 150° C. and then a vacuum of about 29" (Hg) is applied to the system. The first 50 ml of the distillate is discarded. The collection of NMP distillate starts at 94° C./29" (Hg) and ends at $T_b - 101/30"$ (Hg). The total distillate collected is about 1300 ml, with about 150 ml of yellowish residual NMP discarded. The freshly distilled NMP is then run through the LINDE Molecular Sieve, Type 4A PLTS, sold by Union Carbide Corporation, Materials System Division.

The N,N-dimethylformamide (DMF) as sold by Fisher Scientific Company, has a labeled $T_b-152.5°-153.6°$ C. with a density of 0.944 at 25° C. The DMF is also distilled under vacuum similarly and then dehydrated by Molecular Sieve as described above.

The phenol, as supplied by USS Chemicals, has a $T_m-39.5°-41.5°$ C., and is used as such.

The m-cresol, as sold by Aldrich Chemical Company, Inc., has a $T_b=203°$ C. with $n_D^{20}-1.5392$ and is used as such.

EXAMPLE I

Procedure For Preparation Of Polyimide Dianhydride

Into a 500 ml round bottom flask is loaded 150 ml of phenol with 10 ml of toluene. The solution is quickly heated to 166° C. and 0.4 ml of $H_2O$ is distilled off in about one hour. The distillation is continued for another hour at which time there is no more water obtained in the Dean Stark trap. The solution is cooled to about 60° C., then a solid powder mixture of 24.4 g of 2,4-toluenediamine (TDA) (0.2 moles) and 96.67 g of 3,3'4,4'-benzophenonetetracarboxylic dianhydride (BTDA) (0.3 mole) is added into the solution slowly in order to control the exotherm reaction and solution temperature. The solution is rigorously mixed at temperatures of about 60° C.+3° C. for 2 hours, then 0.2 g of 1,4-diazabicyclo-(3,3)-octane (DABCO) is added and the solution is slowly heated to 160° C. When the solution temperature reaches about 130° C., the first drop of water appears in the Dean Stark trap. The degree of imidization at 145° C. is about 53%, at 153° C. about 84%, at 157° C. about 93%. After 2 hours above 157° C. to the maximum of 160° C., the imidization is completed. A total of 7.2 g of distilled $H_2O$ is recovered. The total reaction time above 150° C. is about 4 hours. The polyimide is precipitated by adding 700 ml of acetone. The yield is 108 g or about 95%. The $r_m$ for this product is 0.667; the DP is 5; n is 2 and the C is 1.0. This polyimide is designated as: [BTDA-DTA]$_2$[AH]$_2$ which is soluble in both NMP and DMF.

The above procedure is repeated a number of times using various diamine monomers in place of the TDA and various molar proportions of diamine and dianhydride so that n has the value indicated in each case in TABLE I.

The solubility of each polyimide dianhydride or diamine is tested in dimethylformamide (DMF), N-methyl pyrrolidone (NMP), dimethyl sulfoxide (DMSO) and dimethylacetamide (DMAC) by the following procedure. To 1 g of the polyimide inside an aluminum pan, 4 ml of the solvent is added. The aluminum pan has a wall thickness of about 1/64" with a diameter of about 2 inches. The mixture is placed on a 167° C. hot plate with occasional stirring for 5 minutes. The solubility is then judged. The melting of these oligo-imides is tested by placing about one gram of the oligomer in the aluminum pan and leaving it in a 200° C. oven for 10 minutes. The melting of these oligomers is recorded. Results from both solubility and melting tests are tabulated in TABLE I.

TABLE I

Solubility and Melting Temperature Tests of Polyimide Dianhydrides
(A): [BTDA — x]$_n$ [AH]$_2$: BTDA-polyimide dianhydrides
BTDA is 3,4,3'4'-benzophenonetetracarboxylic dianhydride

| Exp. # | X (Diamine Monomer) | n | Tm** @ 200° C. | Solubility* 1 g/4 ml/167° C./5 min NMP | DMF | DMAC | DMSO |
|---|---|---|---|---|---|---|---|
| A$_1$ | 2,4-toluenediamine (TDA) | 2 | — | + | + | + | + |
| A$_2$ | bis(m-aminophenylene sulfone) (BMASL) | 5 | — | + | + | + | + |
| A$_3$ | bis(p-aminophenylene sulfone) | " | — | — | — | — | — |
| A$_4$ | methylenedianiline | " | — | — | — | — | — |
| A$_5$ | m-phenylenediamine | " | — | — | — | — | — |
| A$_6$ | p-phenylenediamine | " | — | — | — | — | — |
| A$_7$ | oxydianiline | " | — | — | — | — | — |
| A$_8$ | 3,3'dimethoxybenzidine | 20 | — | — | — | — | — |
| A$_9$ | 3,6'-diaminoacridine | " | — | — | — | — | — |
| A$_{10}$ | 2,6-diaminopyridine | " | — | — | — | — | — |
| A$_{11}$ | m-xylenediamine | " | — | + | + | + | — |
| A$_{12}$ | 2,6-toluenediamine | " | — | + | + | + | + |
| A$_{13}$ | 1,3-diaminoanthraquinone | " | — | — | — | — | — |
| A$_{14}$ | m-phenylenediamine | " | — | — | — | — | — |
| A$_{15}$ | p-phenylenediamine | " | — | — | — | — | — |
| A$_{16}$ | 3,5-diaminobenzoic acid | " | — | — | — | — | — |

TABLE I-continued

Solubility and Melting Temperature Tests of Polyimide Dianhydrides
(A): [BTDA − x]$_n$ [AH]$_2$: BTDA-polyimide dianhydrides
BTDA is 3,4,3'4'-benzophenonetetracarboxylic dianhydride

| Exp. # | X (Diamine Monomer) | n | Tm** @ 1 g/4 ml/167° C./5 min 200° C. | Solubility* NMP | DMF | DMAC | DMSO |
|---|---|---|---|---|---|---|---|
| A$_{17}$ | 2,4-toluenediamine (TDA) | " | − | + | + | + | + |

*− means insolubility and + indicates solubility
**− under T$_m$ means no melting up to 200° C.

EXAMPLE II

The procedures of Example I are repeated using in each case the equivalent amount of pyromellitic dianhydride in place of the BTDA. None of the corresponding polyimide dianhydrides is soluble when tested as in Example I nor fusible at any temperature up to 200° C.

EXAMPLE III

Procedure for Preparation of Polyimide Diamines

The procedure of Example I is repeated a number of times using an excess of the diamine and in appropriate proportions to give the n values shown below in TABLE II. Also, shown in TABLE II are the results of the fusion and solubility tests.

TABLE II

Solubility and Melting Temperature Tests of Polyimide
(B): [BTDA − x]$_n$ [NH$_2$]$_2$: BTDA-polyimide diamines
BTDA is 3,4,3'4'-benzophenonetetracarboxylic dianhydride

| Exp. # | X (Diamine) | n | Tm at 1 g/4 ml/167° C./5 min 200° C. | Solubility* NMP | DMF | DMAC | DMSO |
|---|---|---|---|---|---|---|---|
| B$_1$ | oxydianiline | 2 | − | − | − | − | − |
| B$_2$ | oxydianiline | 5 | − | − | − | − | − |
| B$_3$ | oxydianiline | 10 | − | − | − | − | − |
| B$_4$ | bis(m-aminophenylene)sulfone (or 4,4'-sulfonyldianiline) | 5 | − | + | + | + | + |
| B$_5$ | bis(p-aminophenylene)sulfone | " | − | − | − | − | − |
| B$_6$ | methylenedianiline | " | − | − | − | − | − |
| B$_7$ | m-phenylenediamine | " | − | − | − | − | − |
| B$_8$ | p-phenylenediamine | " | − | − | − | − | − |
| B$_9$ | 2,6-toluenediamine | " | − | − | − | − | − |
| B$_{10}$ | 2,4-toluenediamine | 2 | − | + | + | + | + |
| B$_{11}$ | 1,3-diaminopropane | 5 | − | − | − | − | − |
| B$_{12}$ | 1-3-di(3-aminophenoxy)benzene | 5 | − | − | − | − | − |
| A$_1$ | 3,6-diaminoacridine | 10 | − | + | + | + | + |
| A$_2$ | 2,6-diaminopyridine | 10 | − | + | + | + | + |
| A$_3$ | Xylenediamine | 10 | − | + | + | + | + |

None of the above insoluble diamines is soluble when 40 g of the diamine is added to 31 g of NMP and 11.6 g of EPN 1138 (0.0.27 epxoy equivalent) and heated to 80° C. for at least 20 minutes.

EXAMPLE IV

The procedures of Example III are repeated using in each case the equivalent amount of pyromellitic dianhydride in place of the BTDA. None of the corresponding polyimide diamines is soluble when tested as in Example I nor fusible at any temperature up to 200° C.

EXAMPLE V

The Relative Anhydride Reactivity of [BTDA-TDA]HD 2[AH]$_2$

Four polyimide dianhydrides are prepared using the monomer component and proportions of the first procedure of Example I but using as solvent equal amounts of (A) NMP; (B) DMF; (C) phenol and (D) m-cresol, respectively.

The relative reactivities (I$_R$) of the respective polyimide dianhydrides are measured as the ratio of the Infrared Spectrum adsorption peak of the anhydride at 1840 cm$^{-1}$ to that of the imide at 1790 cm$^{-1}$. These reactivities are reported below in TABLE III.

TABLE III

| Polyimide Dianhydride | Solvent | I$_R$ |
|---|---|---|
| A | NMP | 0.16 |
| B | DMF | 0 |
| C | Phenol | 0.33 |
| D | m-cresol | 0.36 |

EXAMPLE VI

The polyimide dianhydrides A, B and C prepared in Example V are tested for reactivity with a Novolac epoxy resin, marketed by Ciba-Geigy, EPN 1138 which has an epoxy equivalent of 185–195. In each case, 25 g of EPN 1138 (0.1351 equivalent) is mixed with 70 g of the polyimide dianhydride A, B or C and 168 g of NMP to solutions of 36% and heated at the temperatures and for the periods indicated below in TABLE IV. The ratio (R) of epoxy equivalents to anhydride equivalents in each case is 1.10. The respective viscosities are also reported in TABLE IV.

TABLE IV

| Polyimide Dianhydride Centipoises | Solvent Used In Prep. | Temp. | | Resultant Viscosity Time |
|---|---|---|---|---|
| A | NMP | 90° C. | 7 hrs. | 32 |
| B | DMF | 80° C. | 8 hrs. | 20 |
| $C_1$ | Phenol | 65° C. | 4 hrs. | 260 |
| $C_2$ | Phenol | 80° C. | 4 hrs. | 1,150 |

The respective viscosities relate to the respective anhydride activities as reported in Example V.

The above polyimide-epoxy resin solutions are applied individually onto 181E type glass cloth by hand, spreading and rolling it by using a roller over both faces of the glass cloth. The impregnated fabrics are dried in a well ventilated hood for at least 48 hours, then in a forced air oven at 65° C.-75° C. for about one hour. About 25 of the strips are loaded into a mold at temperatures of about 167° C. After the press is closed and pressure is applied (~200 psi), the temperature of the mold is increased to about 180° C. within about 8 minutes. The die is then opened and the specimen is removed for testing. The tested results are listed below in Table IVa.

TABLE IVa

| | Property of Polyimide Dianhydride-Epoxy Laminate | |
|---|---|---|
| Example IV | Flexural Strength/Modulus $(10^{-3}/10^{-6}$ psi) | Resin Content |
| A | Delamination after opening of press | — |
| B | " | — |
| $C_1$ | 48.6 ± 3.5/3.1 ± 0.2 | 26.3 ± 2.5% |
| $C_2$ | 57.5 ± 4.6/3.6 ± 0.3 | 27.3 ± 2.2% |

A polyimide-epoxy laminate using an oligo-imide dianhydride [BTDA-TDA]$_5$[AH]$_2$ prepared from NMP solution ($I_R$=0.12, C-1.0), then following a similar procedure as for the above preparation also delaminates upon molding.

EXAMPLE VII

A polyimide dianhydride and several polyimide diamine components are prepared according to the procedures of Examples I and III. The dianhydride is [BTDA-Oxydianiline]$_{20}$-[AH]$_2$ which is insoluble in NMP, DMF and DMAC. The various polyimide diamines are identified below and each is found to be soluble in NMP, DMF and DMAC. These are:

No.
$A_1$ [BTDA-3,6'diaminoacridine]$_{10}$[NH$_2$]$_2$
$A_2$ [BTDA-2,6-diaminopyridine]$_{10}$[NH$_2$]$_2$
$A_3$ [BTDA-xylenediamine]$_{10}$[NH$_2$]$_2$
$A_4$ [BTDA-2,4-diaminotoluene]$_{10}$[NH$_2$]$_2$
$A_5$ [BTDA-2,4-diaminotoluene]$_2$[NH$_2$]$_2$ A number of mixtures are prepared using the above insoluble dianhydride component in an AH/NH$_2$ ratio ($r_o$) of 0.5/1 with each of the above soluble diamine components. The respective combinations are mixed with NMP, DMF and DMAC and after mixing at room temperature to about 60° C. for at least 30 minutes, each of the mixtures is found to be soluble in each of the solvents.

EXAMPLE VIII

The procedure of Example VII is repeated except that a soluble diamine component [BTDA-2,4-toluenediamine]$_{10}$[NH$_2$]$_2$ is prepared and mixed respectively with the following insoluble dianhydride components in the NH$_2$/AH ratio ($r_o$) of 0.5:

No.
$B_1$ [BTDA-3,3'-dimethoxybenzidine]$_{20}$[AH]$_2$
$B_2$ [BTDA-2,6-diaminoanthraquinone]$_{10}$[AH]$_2$
$B_3$ [BTDA-m-phenylenediamine]$_{10}$[AH]$_2$
$B_4$ [BTDA-p-phenylenediamine]$_{10}$[AH]$_2$
$B_5$ [BTDA-naphthalenediamine]$_{20}$[AH]$_2$
$B_6$ [BTDA-m-phenylenediamine]$_{15}$[AH]$_2$
$B_7$ [BTDA-p-phenylenediamine]$_{10}$[AH]$_2$ The respective mixtures are found to be soluble in each of DMF, NMP and DMAC.

EXAMPLE IX

The procedure of Example VII is repeated using the soluble [BTDA-2,4-toluenediamine]$_{20}$[NH$_2$]$_2$ in admixture in an AH/NH$_2$ ratio ($r_o$) of 0.5/1 with each of the following insoluble polyimide dianhydrides:

No.
$C_1$ [PMDA-m-aminophenylenesulfone]$_5$[AH]$_2$
$C_2$ [PMDA-m-phenylenediamine]$_5$[AH]$_2$
$C_3$ [PMDA-2,4-toluenediamine]$_5$[AH]$_2$
$C_4$ [PMDA-2,6-toluenediamine]$_5$[AH]$_2$ The respective mixtures are each found to be soluble in DMF, NMP and DMAC respectively.

EXAMPLE X

The procedure of Example VII is repeated using the soluble [BTDA-2,4-toluenediamine]$_{20}$[AH]$_2$ in admixture in the NH$_2$/AH ratio ($r_o$) of 0.5/1 with each of the following insoluble polyimide diamines:

No.
$D_1$ [PMDA-bis(m-aminophenylene)sulfone]$_5$[NH$_2$]$_2$
$D_2$ [PMDA-m-phenylenediamine]$_5$[NH$_2$]$_2$
$D_3$ [PMDA-2,6-toluenediamine]$_5$[NH$_2$]$_2$
$D_4$ [PMDA-2,4-toluenediamine]$_5$[NH$_2$]$_2$ The respective mixtures are each found to be soluble in NMP, DMF and DMAC respectively.

EXAMPLE XI

A. Preparation of [BTDA-ODA]$_5$[NH$_2$]$_2$:

The procedure of Example I is repeated by reacting 50.06 g of oxydianline (0.25 mole) with 67.12 g of BTDA (0.2133 mole) in 300 g of m-cresol. The imidization is carried to the solubility limit of the resin after the solution temperature reaches 156° C. for 30 minutes. The amount of water distilled off the reaction is 3.0 g (or the "C" is 40.1%). After separation of the polyimide product, it is tested and found to be not soluble in NMP or DMF.

B. Preparation of [BTDA-TDA]$_5$[AH]$_2$

The procedure of Example I is repeated by reacting 80.56 g of BTDA (0.25 mole) with 25.4 g of 2,4-toluenedianiline (0.2086 mole) in 300 g of phenol. The imidization is completed after the solution temperature reaches over 155° C. for 2 hours with a final temperature of 162° C. The amount of water distilled off is 7.5 g. The recovered resin is soluble in both NMP and DMF. The relative anhydride reactivity, $I_R$, of this resin is 0.24.

C. Preparation of Solution of Insoluble A and Soluble B:

In a reactor, at room temperature, is added 100 g of NMP, 40 g of [BTDA-ODA]$_5$[NH]$_2$ (0.0406 g-equivalent as prepared above in A); 40 g of [BTDA-TDA]$_5$-[AH]$_2$ (0.046 g-equivalent as prepared above in B); and 20 g of EPN 11381 (0.1081 g-equivalent). The mixture is heated to 80° C. for 2 hours and a homogeneous solution is obtained.

D. Preparation of Polyimide-Epxoy/Fiber Cloth Laminate

The above-polyimide epoxy resin solution is applied onto 181E type glass cloth by hand, spreading and rolling it by using a roller over both faces of the glass cloth. The impregnated fabrics are dried in a well ventilated hood for at least 48 hours, then in a forced air oven at 65° C.-75° C. for about one hour. The fabric is cut into many $\frac{1}{2}''\times 5''$ strips. About 25 of the strips are loaded into a mold at temperatures of about 165° C. After the press is closed and pressure is applied ($\sim$200 psi), the temperature of the mold is increased to about 180° C. or higher within 8 minutes. The die is then opened and the laminated product is removed for testing. The tested results are listed below in Table XI.

TABLE XI

|  | Molding Temp/Time | | Resin Content | Flex. Strength/Modulus |
| --- | --- | --- | --- | --- |
|  | Time | (°C./Min.) | % | in psi ($10^3/10^6$) |
| XI$_{A1}$ | 165 | 180/8 | 29 ± 2 | 51.4/2.5 |
| XI$_{A2}$ | 165 | 180/8 | 27 ± 2 | 58.8/2.5 |
| XI$_{A3}$ | 165 | 220/8 | 28 ± 2 | 52.1/4.3 |

EXAMPLE XII

Similar satisfactory results are obtained when the lamination procedure of Example XI is repeated individually with each of the solutions of Examples VII, VIII, IX and X.

In some of the insoluble polyimide components prepared in the above examples, some of the polyimide derivatives are not completely imidized since an insoluble state is reached before imidization is completed. It is intended that the present invention includes within its scope the use of polyimide components in which amic acid groups are still present in a substantial amount to an extent of less than 60% and preferably less than 50%. For good lamination at 180° C., it is advantageous to have less than 10%, preferably less than 5% amic acid present.

It is sometimes preferable to first react a solution of a soluble polyimide dianhydride with a polyepoxide at a temperature of 25° C.-120° C., preferably 25° C.-50° C. for at least one hour and then to add an insoluble polyimide diamine which, upon stirring, is dissolved in the intermediate product and is reacted at a temperature of 50°-120° C., preferably 60°-90° C. for at least one hour. The amount of polyepoxide used is sufficient to react with both the polyimide dianhydride and the polyimide diamine.

While certain features of this invention have been described in detail with respect to various embodiments thereof, it will of course be apparent that other modifications can be made within the spirit and scope of this invention, and it is not intended to limit the invention to the exact details insofar as they are defined in the following claims.

The invention claimed is:

1. The process of reacting a polyepoxide with a solution of a polyimide dianhydride together with another polyimide component selected from the class consisting of polyimide dianhydrides and polyimide diamines, at least one of which polyimide components is insoluble in the selected solvent in the absence of said other polyimide component or components, the proportion of the said insoluble component or components representing 15 to 65 percent by weight of the total combined weight of said polyimide components, the anhydride activity of each of said polyimide dianhydride components being at least 0.17 as determined by the infrared spectrum, and the ratio of epoxy equivalents to anhydride plus amine equivalents being at least 1:1, the concentration of said polyimide components in said solvent comprising at least 5 percent by weight, in which polyimide components the polyimide dianhydride is represented by the formula:

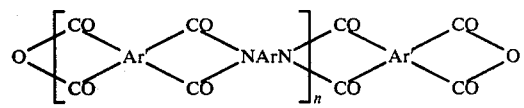

and the polyimide diamine is represented by the formula:

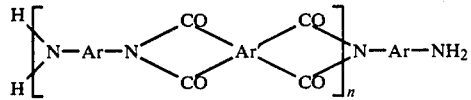

wherein Ar' is a tetravalent aromatic organic radical, the four carbonyl groups being attached directly to separate carbon atoms and each pair of carbonyl groups being attached to adjacent carbon atoms in the Ar' radical except that in the case of the Ar' being a naphthalene radical one or both pairs of the carbonyl groups may be attached to peri carbon atoms; Ar is a divalent aromatic radical; and n is an integer of at least one; in which polyimide components there may be as much as 50 percent of the cyclic polyimide structure in the intermediate amic acid structure, the solubility of said polyimide components being determined by heating one gram of said component in 4 ml. of the selected solvent at a temperature of 167° C. for 5 minutes.

2. The process of claim 1, in which the portion of insoluble polyimide component represents 15-50 percent by weight of the combined weight of said polyimide components.

3. The process of claim 2, in which the concentration of said polyimide components in said solvent comprises at least 20 percent by weight.

4. The process of claim 1, in which the reaction with the polyepoxide is conducted at a temperature of 25°-130° C.

5. The process of claim 1, in which the solvent is selected from the class consisting of N,N-dimethylformamide, N,N-dimethylacetamide and N,N-methyl-pyrolidone.

6. The process of claim 5, in which the soluble polyimide component is selected from the class consisting of polyimides prepared by the reaction of 3,4,3',4'-benzophenonetetracarboxylic dianhydride with 2,4-toluenediamine or m-aminophenylenesulfone.

7. The process of claim 6, in which the insoluble polyimide component is prepared by the reaction of 3,4,3',4'-benzophenonetetracarboxylic dianhydride with a diamine selected from the class consisting of:
   (a) oxydianiline
   (b) 3,3'-dimethoxybenzidine
   (c) 2,6-diaminoanthraquinone
   (d) m-phenylenediamine
   (e) p-phenylenediamine
   (f) naphthalenediamine 8. The process of claim 1, in which the polyepoxide has the structural formula

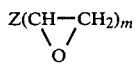

wherein Z is an organic radical having a valency of m, and m is an integer having a value of at least 2.

9. The process of claim 8, in which m has a value of 2-20.

10. The process of claim 8, in which the polyepoxide resin is a Novolak resin having at least two glycidyl groups attached to aromatic nuclei therein through the oxygen of the original hydroxy groups.

11. The process of claim 8, in which the polyepoxide is a polyglycidyl acrylate, a polyglycidyl methacrylate or a polyglycidyl chloracrylate.

12. The process of claim 1, in which the ratio of equivalents of epoxide to anhydride is no less than 2/1.

13. The process of claim 1, in which the molar ratio of polyimide dianhydride is in the range of 0.50-2 per mole of polyimide diamine and outside the range of 0.9 to 1.10 of polyimide diamine.

14. The product made by the process of claim 1.

15. The cured product made by removal of solvent from the product of claim 14 and thereafter curing the product at a temperature of at least 120° C.

16. The cured product of claim 15, in which said temperature is at least 150° C.

* * * * *

UNITED STATES PATENT AND TRADEMARK OFFICE
CERTIFICATE OF CORRECTION

PATENT NO. : 4,410,664
DATED : October 18, 1983
INVENTOR(S) : Chung J. Lee

It is certified that error appears in the above—identified patent and that said Letters Patent is hereby corrected as shown below:

Col. 2, line 58; correct "laiminates" to read "laminates".

Col. 15, line 17, change "When m" is one" to read "When n" is one".

Signed and Sealed this

Thirty-first Day of January 1984

[SEAL]

Attest:

GERALD J. MOSSINGHOFF

Attesting Officer     Commissioner of Patents and Trademarks